US008417565B2

(12) United States Patent
Summer et al.

(10) Patent No.: US 8,417,565 B2
(45) Date of Patent: *Apr. 9, 2013

(54) ELECTRONIC-COMMERCE, COMMUNICATION-NETWORK METHOD

(76) Inventors: Robert D Summer, New York, NY (US); Jon M. Dickinson, Portland, OR (US)

( * ) Notice: Subject to any disclaimer, the term of this patent is extended or adjusted under 35 U.S.C. 154(b) by 325 days.

This patent is subject to a terminal disclaimer.

(21) Appl. No.: 12/836,566

(22) Filed: Jul. 14, 2010

(65) Prior Publication Data

US 2010/0280923 A1 Nov. 4, 2010

Related U.S. Application Data

(63) Continuation of application No. 12/387,084, filed on Apr. 27, 2009, which is a continuation of application No. 11/174,023, filed on Jul. 1, 2005, now Pat. No. 8,185,433.

(51) Int. Cl.
*G06Q 30/00* (2012.01)
*G07G 1/14* (2006.01)

(52) U.S. Cl. ........................................ 705/14.1; 705/14.4

(58) Field of Classification Search ............. 705/14
See application file for complete search history.

(56) References Cited

U.S. PATENT DOCUMENTS

| | | |
|---|---|---|
| 2002/0052885 A1 | 5/2002 | Levy |
| 2002/0138576 A1 | 9/2002 | Schleicher et al. |
| 2002/0147689 A1 | 10/2002 | Falkner |
| 2002/0186844 A1 | 12/2002 | Levy et al. |
| 2003/0065774 A1 | 4/2003 | Steiner et al. |
| 2003/0074322 A1 | 4/2003 | Wu |
| 2003/0076955 A1 | 4/2003 | Alve et al. |
| 2003/0078918 A1 | 4/2003 | Souvignier et al. |
| 2003/0130862 A1* | 7/2003 | Stern et al. .................. 705/1 |
| 2003/0131044 A1 | 7/2003 | Nagendra et al. |
| 2003/0149781 A1 | 8/2003 | Yared et al. |
| 2003/0191720 A1 | 10/2003 | Wibisono |
| 2003/0212710 A1 | 11/2003 | Guy |

(Continued)

FOREIGN PATENT DOCUMENTS

JP 2005267582 A * 9/2005

OTHER PUBLICATIONS

McMullan, Ed; Vesper, KH; Becoming an Entrepreneur: A Participant's Perspective; The International Journal of Entrepreneurship and Innovation, vol. 1, No. 1, Feb. 1, 2000, pp. 33; Published by IP Publishing Ltd.*

*Primary Examiner* — Arthur Duran
(74) *Attorney, Agent, or Firm* — Jon M. Dickinson, Esq.

(57) ABSTRACT

A sourcing-provider-implemented, electronic-commerce, communication-network method for controlling acquisition-access to electronically-deliverable, affinity-interest deliverables in portions of which rights are held both by a sourcing provider and by a contributing network communicant. The method includes (a) establishing an electronic, network-connected, sourcing-provider-associated-and-controlled catalogue designed to contain at least one such deliverable, (b) vetting the entrepreneurial talent of at least one network communicant relative to the creation, catalogue-placement, and network-acquisition-promotional offering to others, by that one communicant of such a deliverable, whereby, through deliverable-creation and catalogue-placement thereof, the vetted network communicant becomes a contributing network communicant, (c) authorizing the vetted network communicant to become a contributing network communicant, and to create, to place or have placed, and to offer to other network communicants, deliverables-acquisition network access to such a catalogue-placed deliverable, and (d) rewardingly incentivizing such offers.

1 Claim, 6 Drawing Sheets

U.S. PATENT DOCUMENTS

Figure 1:
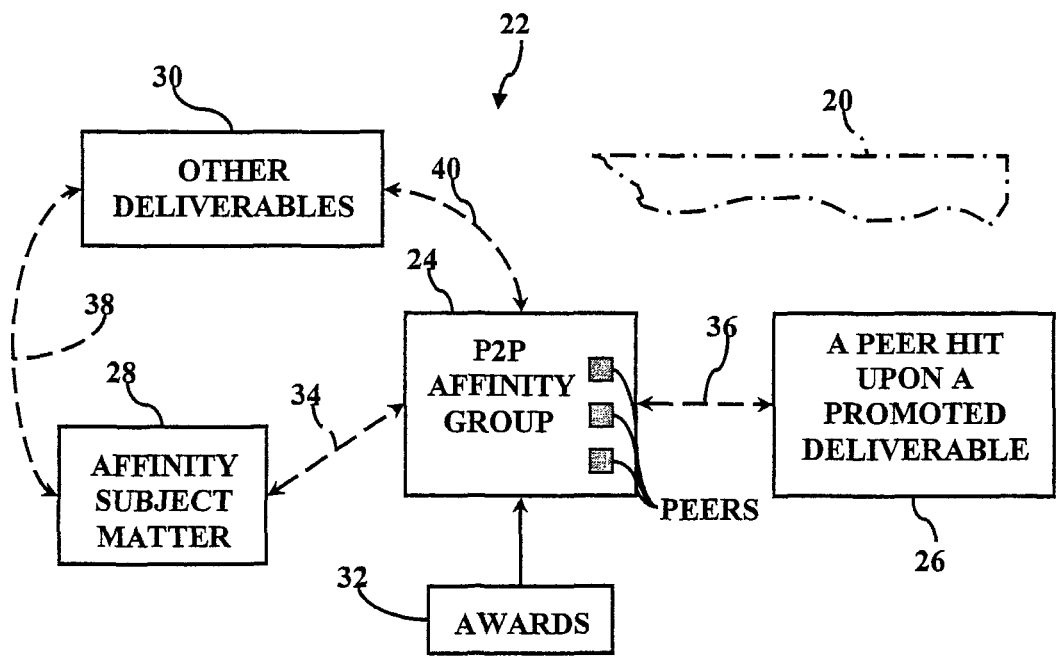

| | | |
|---|---|---|
| 2003/0212790 A1 | 11/2003 | Thambidurai et al. |
| 2003/0236886 A1 | 12/2003 | Oren et al. |
| 2004/0024727 A1 | 2/2004 | Bowman |
| 2004/0230511 A1 * | 11/2004 | Kannan et al. .................. 705/35 |
| 2005/0004837 A1 | 1/2005 | Sweeney et al. |
| 2007/0198426 A1 * | 8/2007 | Yates ............................. 705/59 |

* cited by examiner

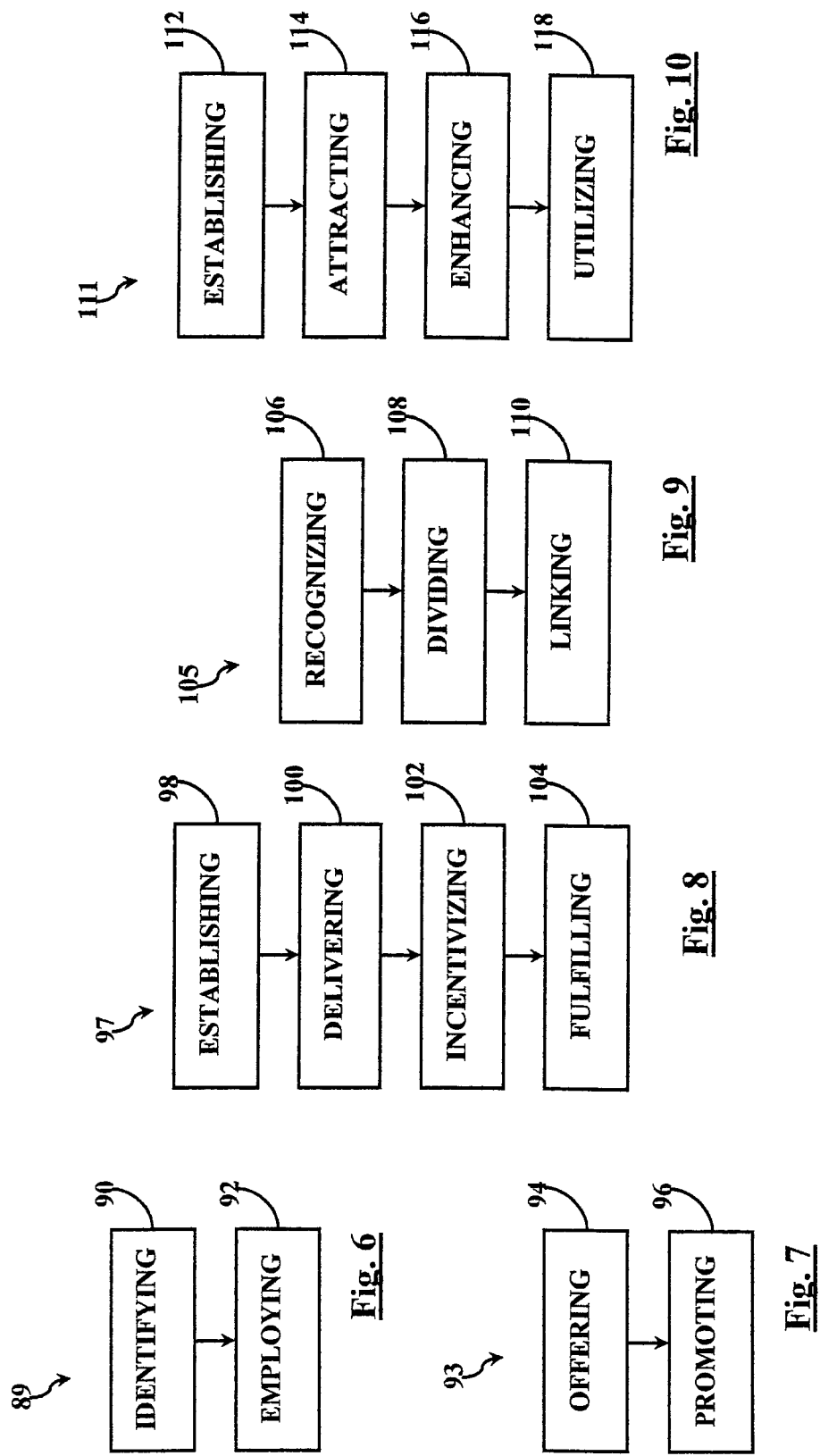

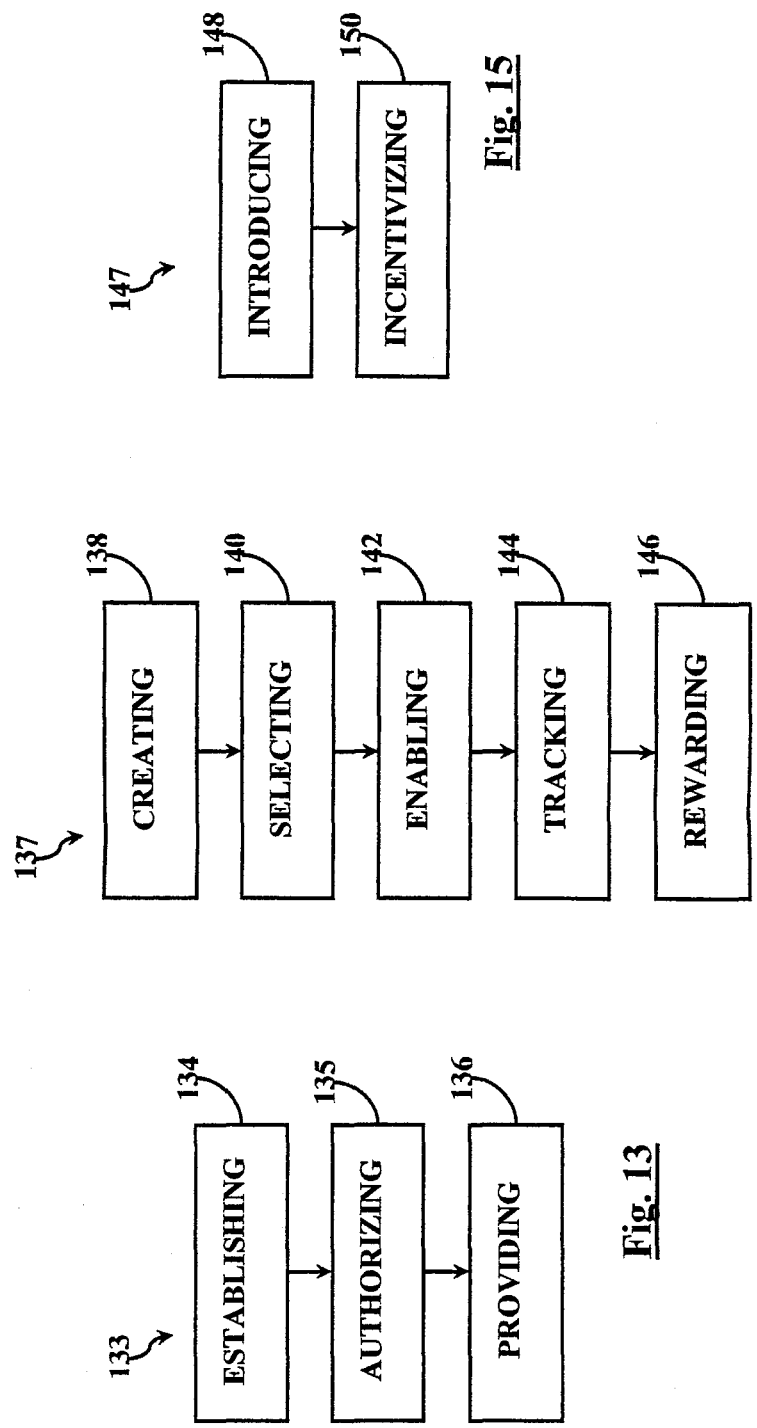

ELECTRONIC-COMMERCE, COMMUNICATION-NETWORK METHOD

CROSS REFERENCES TO RELATED APPLICATIONS

This application is a continuation from currently copending U.S. patent application Ser. No. 12/387,084, filed Apr. 27, 2009, for "Network-Affinity-Group Commerce Method Involving System Management Fulfillment", which application is a continuation from U.S. patent application Ser. No. 11/174,023, filed Jul. 1, 2005, for "Peer-to-Peer Affinity-Group Commerce Method and System", an application claiming priority to each of U.S. Provisional Patent Application Ser. Nos. 60/585,491, filed Jul. 2, 2004, for "P2P Information-Exchange, Collateral-Transaction-Promoting, Business Method", and 60/585,492, filed Jul. 2, 2004, for "Peer-to-Peer Affinity-Group Communication Commerce Method and System". The entireties of the disclosure contents contained in all of these prior applications are hereby incorporated herein by reference.

FIELD, BACKGROUND AND SUMMARY OF THE INVENTION

The present invention pertains to a sourcing-provider-implemented, electronic-commerce method carried out over an electronic communication network, such as the Internet, for controlling acquisition-access to electronically-deliverable, affinity-interest deliverables in portions of which rights are held both by such a provider and by one known as a contributing network communicant.

In the practice of the invention, an entrepreneurially vetted network communicant, also referred to as a network peer, is authorized by a person called a sourcing-provider to use his or her active entrepreneurial talent, to promote, to other network communicants, commercial access to a controlled, network-connected catalogue of electronic deliverables, such as electronic media-content (music, film, electronic applications) deliverables, made available by deliverables rights-holders, including, as rights-holders, both such a sourcing-provider, and a vetted, contributing network communicant. The term "media" employed herein, and throughout the underlying history of this application, has been used in its broadest sense to include and mean "electronic deliverables" and "electronic media-content deliverables" in all categories of such deliverables.

Deliverables rights-holders, also referred to herein as legal persons, or personages, may be drawn from all categories of such persons (legal persons)—i.e., individuals, business entities, etc.—who are, or may be, involved in different ways with the creation of all or parts of the architectures and contents that characterize catalogue deliverables. Such rights-holders may include, for examples, a record label, a movie label, an artist, a software designer, such as a software-platform designer, and also what we call a "vetted, contributing" network communicant who might create, as an illustration, an electronic application based upon the software-platform contribution of a software-platform designer, etc. There are various illustrations of the latter kind of catalogue deliverable, as, for example, the recorded musical artistry of a musician which artistry conventionally "rests upon", and combines with, underlying music-mix-and-editing software/architecture furnished by a promotional-, a technical-, and/or an engineering-, furnisher of that "rested-upon" electronic portion of a music media deliverable.

Catalogue deliverables are also termed herein affinity-interest deliverables, or affinity-interest subject matter.

As will be seen, the invention specifically addressed herein forms a contribution to the art which is contained as one of the several facets of such contributions that are expressed in the body of disclosure presented both hereinbelow, and in the above-identified, precursor, provisional and regular U.S. patent applications (sometimes with different, specific language, or terminology, e.g., "peer" vs. "network communicant"). This newly addressed facet relates (as will be seen from the invention description which is provided below) to an aspect of an earlier (herein in the underlying history of this application) focused-upon facet which is associated with conventionally understood P2P file-sharing behaviors wherein P2P file sharers introduce, for network communication to other peers, additions to, and/or modifications of, digital, media-file content which has been created by another party, i.e., content involving their own creative efforts. The facet illustrated and discussed in this application involves this just-mentioned "addition"-type behavior.

Continuing, the invention facet illuminated herein (as suggested above) focuses particular attention on communication-network methodology associated with operative, commercial relationships established between different legal personages herein named (a) sourcing-provider (an identifying name previously employed in the predecessor cases), (b) network communicant (a peer), (c) vetted network communicant (a vetted peer), and (d) contributing network communicant (a category of peer explained below).

In a more specific sense, and in the context of outlining its realm of operation and its basic steps, the present invention may be described as a sourcing-provider-implemented, electronic-commerce, communication-network method for controlling commercial-transaction network-acquisition-access to particular, electronically-deliverable, affinity-interest deliverables in portions of which rights are held both by a sourcing provider and by a contributing network communicant, where (a) a sourcing-provider is a legal person having a common interest in all, relevant, affinity-interest deliverables, (b) a network communicant is a legal person having an affinity attachment to defined, electronically-deliverable, affinity-interest subject matter which may become associated by that network communicant with an affinity-interest deliverable, and (c) a contributing network communicant is an entrepreneurially-vetted and authorized network communicant.

The method is confinedly implementable in a network of the kind mentioned, and includes, as steps: (1) establishing an electronic, network-connected, sourcing-provider-associated and controlled catalogue designed to contain at least one such deliverable; (2) vetting the entrepreneurial talent of at least one network communicant in relation to the creation, catalogue-placement, and network-acquisition-promotional offering to others, by that one communicant of such a deliverable, whereby, through deliverable-creation and catalogue-placement thereof, the vetted network communicant becomes a contributing network communicant; (3) authorizing the vetted network communicant to become a contributing network communicant, and to create, to place or have placed, and to offer to other network communicants, commercial-transaction, deliverables-acquisition network access to such a catalogue-placed deliverable; and (4) rewardingly incentivizing such network-acquisition offers made by the contributing network communicant.

In the specification text which follows, the above legal-personage terms herein employed as names that are considered to be especially appropriate to the disclosed, and below-claimed, invention methodology, along with expositions characterizing the methodologic working relationships between, and associated with, them, are woven at useful locations into the immediate predecessor case's appropriately restated and edited text.

In the below, more detailed description of the invention and its operating environment, the invention is illustrated and explained in the context of the other facets of the invention elaborated heretofore, i.e., in the context of a network computer-implemented methodology for enhancing computer-network commerce, such as Internet commerce, illustratively associated with the related, widespread and significant, affinity-interest practice known as peer-to-peer (P2P) network file sharing, and also with naturally associated, commercial-fulfillment system-management methodology that may be implemented under the control and/or management assistance of a system manager regarding deliverables-purchases fulfillment. The invention strongly links with computer support of such associated methodology as it relates to the unique, commerce-spurring use of digital media, and like electronically deliverable, files as a powerful vehicle for enhancing and growing areas of commerce.

System management in this context of purchasable deliverables includes, of course, all sales-support, including ancillary-support management functions that are normally associated with such management. With this system setting in mind, we further point out that practice of the present invention may take place in the setting of system management and fulfillment activities that are furnished in relation (a) to plural "areas" of affinity-interest commerce activities, such as those linked to plural, widely distributed, different-affinity-interest network-groups, and therefore (b), also to functionally associated, network-communicant-utilized, widely distributed networked computers, servers and databases that are functionally linked, and readily accessible by such participants, en masse, over an extensive computer network. Those skilled in the art will recognize that, in this setting of the invention, networked consumer participants/communicants need only possess, or have appropriate use-access to, what is, by today's standards, a relatively simple electronic computer, or the like, to experience and participate in invoking the unique features of the invention.

Figure 2:
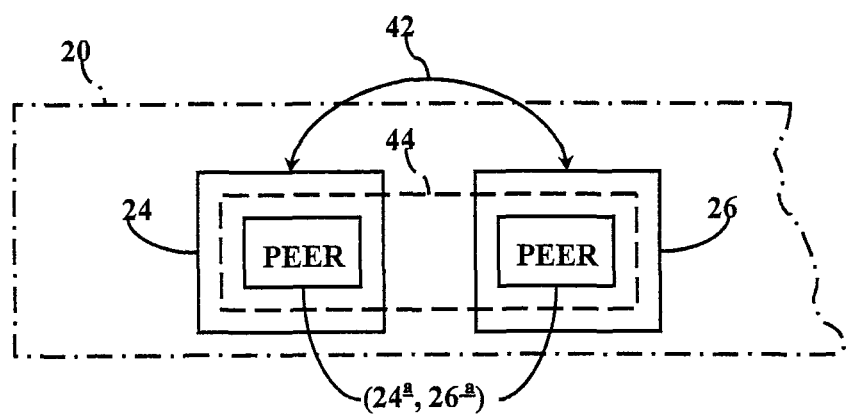

With respect to the "en masse" reference just made above, FIG. 2 in the drawings herein, as will be more fully explained, and as will be apparent to those skilled in the "art" of networks, such as the Internet, illustrates an elemental, network "plurality", or subassembly, region, i.e., a region which forms a "building-block" element that is multipliable open-endedly to create a plurality of such regions, in an extensive, en masse network regime.

Speaking now in a background and setting manner about the present invention in the representative arena of the world of file-sharing, and using principally the term "peer" (synonymous herein with the term "network communicant"), it is well known and recognized today that the practice of peer-to-peer (P2P) file sharing over a wide-area network, such as the Internet, is one of the most popular and rapidly expanding practices in history. This practice, which grows dramatically even as we now speak about it, is readily accessible and practicable, utilizing any one of a relatively widely available array of available P2P file-sharing intercommunication technologies, by essentially all in the world who have computer access to the Internet.

Unfortunately, and we believe mistakenly, P2P file sharing has, in the last few years, come to be viewed by some as an enemy of certain commerce—particularly commerce involving provider-controlled electronically distributable media content, such as music and movie files. In this "enemy" mode of thinking, the various conflicts which have arisen between P2P file sharers, providers of communication software/technology which enables P2P file sharing, and copyright rights holders (providers) associated with such electronic media content, have centered on the issue of apparent massive copyright infringement in the form of file acquisitions and use without payments to rights holders. These conflicts have unhappily pitted certain among these parties against one another as hostile legal combatants.

Notwithstanding this landscape of "copyright contention", the present invention, in its proposed unique methodology and systemic management approach to the world of P2P file sharing, recognizes and proposes a paradigm shift based upon a recognition that the extraordinary and massive communication, computing, and data-storage and handling bandwidth which is represented by the world of P2P file sharing can, in fact, be tapped creatively, along with the affinity interests of P2P file sharers, as vehicles and growth engines for the promotion, expansion and impressive enlarging of many forms of commerce, including commerce relating to electronically distributable media per se.

By proposing, as underlies a principal cornerstone of the present invention, a significant change in the thinking about how P2P file sharing, and associated software and communication technologies, can be constructively employed, and indeed how a network-accessing "purchasing consumer"— another network communicant—can be converted effectively to become a positive part of the distribution "machinery" of network-purchasable deliverables, one can be brought to recognize that P2P file sharing offers an unparalleled and historically monumental opportunity for the expansion of commerce in many, if not all, forms of goods and services under the dominion of parties both inside and outside of the P2P network world. It can do this quite simply through harnessing the unique and specialized entrepreneurial talents, behaviors and the enthusiasms of P2P electronic-media file sharers, in a kind of piggyback fashion, to link with the communication traffic most affectionately focused upon by P2P affinity-group file sharers specially permitted, managed, controlled and appropriately, ultimately fulfilled offers of sales for various goods and services.

Such goods and services may reside (a) only in the field of electronic media (such as music song, film, and software application, files), (b) only in a variety of ancillary fields which are outside the electronic media field, and which may not be specifically "affinity-interest" subject matter, and or (c) in a blend of these two fields. Accordingly, it should be understood that references made herein to a catalogue, or to catalogues, i.e., physical, digital-data catalogue(s), of deliverables are intended to convey the understanding that such deliverables may "reside" in any one of these single or blended "fields", in the form of representative, or appropriately representing, electronic data which, through transformation into sound, into computer screen imagery, etc., is "viewable in and from" such a catalogue. In fact, and as will be well understood by those skilled in the art, the catalogue electronic representations of these deliverables may "sit" in a widely distributed condition electronically in and throughout the cloud defining part of a network. As will be seen, much subject matter which is sale-offered in a network setting in the context of the present invention, either directly is, or becomes "associated" as being ancillary to, affinity-interest subject matter.

For example, and as an important illustration for describing the context of the present invention, a very good and representative P2P affinity group might be a group of such file sharers who have a special interest in a particular style, or genre, of music, or a similar affinity group with a special interest in various computer-hardware-implementable applications. There are, of course, many other relevant examples of affinity groups, and practice of the present invention is not constrained just to "music genre" and "applications-genre" groups. Put another way, implementation and practice of the present invention offers special opportunities for significant expansion of commerce, in addition to electronic media commerce, through what are referred to herein as collateral income-generating transactions, in the contexts of many different affinity-group interests covering a very wide range of subject matters.

The term "collateral" used herein is intended to refer to transactions which are other than conventional, basic file-sharing transactions. The term refers generally to what might be thought of as being "heightened" file-share transactions involving peer-to-peer entrepreneurial activity, as will be explained. A collateral transaction, for example, might be the electronic acquisition by one peer of a music song file, paid for by that peer to the copyright rights holder associated with that file, where the acquisition ultimately results from a peer-to-peer entrepreneurial promotion. A collateral transaction might also be a peer-to-peer-promoted acquisition of some other kind of deliverable, including a peer-specific deliverable, which is not a music, or other electronic, file, and which takes place for fulfillment in the context of an affinity file-share event. Other kinds of collateral transactions, within the imaginations of those implementing the present invention, may of course be accommodated. Indeed, collateral transactions for system manager fulfillment may include an interesting, fulfillable aggregation, or pluralities of fulfillable aggregations, of affinity-interest subject matter, along with various ancillary subject matter.

Specific illustration of management fulfillment in the world of the present invention, and, in particular, in the realm of distributable electronic media and associated affinity-interest subject matter is selected herein because of the extraordinary nature today of P2P file sharing of electronic media, and because of the potentially defusible (by practice of the invention) combative relationships which have surfaced as a consequence of P2P electronic media file sharing. As one will see from a reading of the description of the present invention along with the accompanying, illustrative block/schematic diagrams, practice of the present invention offers a clear opportunity for electronic media rights holders to recognize a very positive market-expansion force, tappable through "viewing" P2P file sharers not as enemies, but rather as powerful entrepreneurial-talent allies. Such an ally relationship can be realized through creating a low-participation-cost environment involving effective sanctioning of P2P file sharing of electronically deliverable files under circumstances where ancillary revenue is stimulated by the reward-based harnessing of the natural entrepreneurial enthusiasms and marketing ingenuities of selected P2P affinity-group members (vetted network communicants, still to be more fully described) to make offerings for sale of selected electronic-media materials.

As will become understood from a reading of the description of the invention, its practice, both in the current, and herein illustrative, high-profile world of P2P file sharers, and in the worlds of other types of affinity-interest "network consumers", effectively causes the relevant consumer population to become part of the mechanism of deliverables-distribution, thereby overcoming, in the case of protected deliverables content, such as electronic media content, the unacceptable instinct for one singly to acquire such content without directing payment to content rights holders.

As one illustration of practice of a facet of the invention generally, P2P file sharers (in a group) who have an affinity interest in a particular kind of music are encouraged to become subscribers to a sanctioned (copyright-liability sanctioned, or freed) P2P file sharing community for the payment of (a) modest monthly fees, and (b) modest additional fees (or selectively in some instances, as with "older" media subject matters, no fees) associated with acquisitions (downloads) of particular media song files. Such song files are additionally referred to herein as rights-associated media, with respect to which copyright owners' rights are referred to as possessor-owned relationship rights.

Particular members (or at least one member, or network communicant) of such a network affinity group are/is vetted for entrepreneurial talent, and thereby selected by what we refer to as sourcing providers (such as media label companies) effectively as "sales agents", also referred to herein as vetted network communicants, to offer, in a P2P sharing manner, various purchasable goods and/or services ("commercial deliverables", including electronic-media deliverables) made available by sourcing providers, or (in a shared-rights, or plural rights-holder, manner) by both a vetted peer and a sourcing-provider, through a controlled, authorized-access-only, centralized, catalogue, or pool, of such deliverables.

These entrepreneurially vetted and selected peer-group members who become, in effect, specially selected surrogates for the associated, vetting sourcing providers in the invention-practice illustration now being given, are encouraged, i.e., incentivized, to innovate and propel their own talents and styles of sales promotions which accompany, or are solely focused upon, as an illustration, distributable-media file sharing. A peer in such a group, selected by sourcing providers to act as a vetted sales representative, may thus, at his or her option, effectively link with offers for distribution of affinity-interest media files to other peers, offers to those peers to consider the purchases of other goods and services from such a catalogue. Only a vetted peer, of course, has electronic authority in the practice of this invention to offer electronic catalogue access to others. Such sales-representative peers may also be authorized/encouraged to offer special goods and services of their own choosing or making along with catalogue-based deliverables of others. For example, an authorized, sales-representative peer might have a special personal collection of affinity-interest memorabilia/collectables which might be attractive to other affinity-interest peers. Permitted to do so within the authorization granted to that authorized peer, he or she could profitably link offers for sale of articles from such a personal collection with offers for the sharing of direct affinity (licensed media song file) subject matter.

With this unique, invention-offered, peer-entrepreneurial approach to file sharing —this proposed new paradigm— implemented with a network affinity group, one will note that much of the basic characteristic of today's "free" file-sharing behavior is actually "imprinted" on the paradigm, without there also being imprinted a situation of rights violations, such as copyright rights violations.

Any peer-promotion-resulting "catalogue-based sales hits", which could include, simply, noticeable sales inquiries, as well, of course, as consummated sales, are appropriately tracked and credited to the offering peer, and appropriately fulfilled by actions, for example, of a system manager. For each such offering peer, a "sales hit" credit account may be kept, with different levels of activities which become summarized in such an account leading to various different kinds of recognitions/awards (hit-redemption values) which act, of course, as incentives for further sales promotional activities. Recognitions/awards may either be delivered automatically to a "deserving/earning" peer, or may be appropriately requested by such a peer.

As will become apparent to those skilled in the art, there are many ways, or facets, in which the basic practice proposed by the present invention, as just above outlined, can be implemented. That basic practice, as can be seen, involves visualizing the world of peer-to-peer file sharing not so much as the world alone (though it may be that) of exchange of particular affinity interest materials between peer group members, but more as an extensive-bandwidth linked-computers and servers network involving potential promoters of sales for a very wide range of goods and services (including rights-held electronic media), the promotions of sales for which lead to peer member awards and recognitions which in turn become incentives both for wider peer group participation, as well as for wider ancillary goods and services providers participation. In point of fact, implementation and practice of the present invention provides a clear opportunity for rights holders, for example, of copyrighted media material, and peer-to-peer file sharers, to see one another as important and cooperative allies in a very new form of extraordinarily widespread and highly active, linked computer and database commerce.

Lying centrally within the present invention, and made clearly evident from the just described basic practice of it, is the concept that it is the quality of natural, personal enthusiasm and "energy", and entrepreneurial talent, of vetted file-sharing peers in a peer affinity group which becomes the harnessed driving force behind promoting the sales of ancillary and electronic-media goods and services in linkage with the basic sharing of affinity subject matter. This concept is to be distinguished from others wherein, for example, (a) ancillary commercial deliverables may be offered for sale to peers in a file-sharing group by virtue of being data-linked directly and specifically to particular shareable media files, or (b) network addresses of peers in a file sharing group are provided to owners/offerers of ancillary deliverables for "direct mail" solicitation. Neither of these approaches taps the important power and potential of individual peer promotion, peer enthusiasm, and peer entrepreneurship.

Another illustration of practice of the invention—one which is very specifically focused upon the invention facet to which the present continuation patent application is directed—involves the creation and network employment of a controlled-access catalogue of electronic deliverables which take the forms of electronic-machine applications (a form of electronic media), or so-called "Apps" (in the language of network communicants), that are popularly implementable on portable or handheld electronic devices, or on other computing devices, such as laptop and desktop computers. In the practice of this facet of the invention, the affinity-interest deliverables are associated with rights that are held both by a sourcing-provider, and by a vetted, contributing network communicant. Such dual rights-holding is similar to right-holding situations which exists in certain instances in the already generally discussed realms of music, video and film media, where content artists on the one hand, and underlying/undersupporting technical recording, editing, mixing, etc., persons on the other, blend their contributions in finally commercially distributable media. It is also similar to the known file-sharing practice involving peer addition to, or modification of, electronic media content created by someone else.

In this "Apps" setting of the invention, the sourcing-provider's rights in catalogue deliverables are based upon the creation/provision of underlying, specific computing-device (s)-compatible, "support-platform" (operating-system-enabling) software which forms a part of such deliverables after being made available for use by a vetted, contributing network communicant, and the vetted, contributing network communicant's rights are based upon a communicant-produced application which has been permissibly linked/integrated, so-to-speak, with that sourcing-provider's permission-tendered (offered), platform-enabling software.

And so, for example, in a typical practice sequence implemented following creation of an appropriate, controlled-access network catalogue, a network communicant who has developed an application which he, she or it wishes to link to platform-enabling software created and/or provided by the sourcing-provider, which software will enable utilization of the application on a particular computing device (such as a hand-held computing device) with respect to which the sourcing-provider's platform software is compatible, may present a request to the sourcing-provider to permit the making of such a linkage, thereafter, to have the linked-application made available as an electronic deliverable through the mentioned, controlled-access catalogue for electronic delivery/sharing over a network to other network communicants. The sourcing provider will then vet the network-communicant applicant for entrepreneurial capability, and the proposed application for commercial viability and acceptability in the controlled catalogue. Following successful vetting, the sourcing-provider will permit the inquiring network communicant to carry out linkage of his, her or its developed application with the sourcing-provider's platform software, and thereby empower/authorize the inquiring network communicant to become a contributing network communicant whose linked application may then be available for controlled-catalogue-access promotion by the contributing communicant for acquisition by other network communicants.

This is fundamentally the same practice as that which was first described above regarding vetting a peer, and furnishing subsequent authorization for that peer both (a) to have commercial-offering (sharing) access to the relevant controlled-access catalogue, as well as (b) to contribute shared-rights (with the sourcing-provider) subject matter to the catalogue.

Among many publicly available documents which provide background related to the present invention are the following: U.S. Patent Application Publication No. 2002/0052885 A1 (use of embedded data with file sharing); U.S. Patent Application Publication No. 2002/0138576 A1 (Method and system for generating revenue in a P2P network); U.S. Patent Application Publication No. 2003/0076955 A1 (system and method for controlled copying and moving of content); U.S. Patent Application Publication No. 2002/0186844 A1(user-friendly rights management systems and methods); U.S. Patent Application Publication No. 2003/0131044 A1 (multi-level P2P network structure for peer and object discovery); U.S. Patent Application Publication No. 2004/0024727 A1 (method and system of re-sharing files with modifications); U.S. Patent Application publication No. 2003/0078918 A1 (method, apparatus and system for file sharing between computers); U.S. Patent Application Publication No. 2003/0212710 A1 (system for tracking activity and U.S. Patent Application Publication No. 2003/0191720 A1 (electronic tracking tag). The disclosure contents of these publications are hereby incorporated herein by reference for background purposes.

The above referred to, and other, important features of the present invention will become more fully apparent as the description of this invention now unfolds in relation to discussions about the several accompanying drawings which illustrate, in block/schematic forms, a number of different ways of visualizing and illustrating manners of practicing the invention.

DESCRIPTIONS OF THE DRAWINGS

FIG. 1 is a very high level block/schematic diagram presented in simplified form to illustrate core features of the present, network-and-computer-based invention.

FIG. 2 is a high level block/schematic diagram illustrating an important variation in implementation and practice of the invention (as illustrated in FIG. 1), wherein a common peer member, network communicant, or network-consumer member, of two, different, chosen affinity-interest groups can function as an important commercial bridge, or gateway, in the practice of the present invention involving the activities of such two different network affinity groups. This figure in fact pictures what may be visualized as being an "elemental, representative region" (i.e., a region subject to extensive, incremental replication/repetition) in a massive network of the kind involving a huge plurality of widely distributed network-communicant participants, and remotely accessible computers, servers, databases, software services, etc., popularly referred to for years, in the context, at least, of the Internet, metaphorically as an Internet "cloud". This being so, FIG. 2, as presented in the parent to the present continuation application, can be viewed as illustrating the now popular behavioral term "cloud computing".

Figure 3:
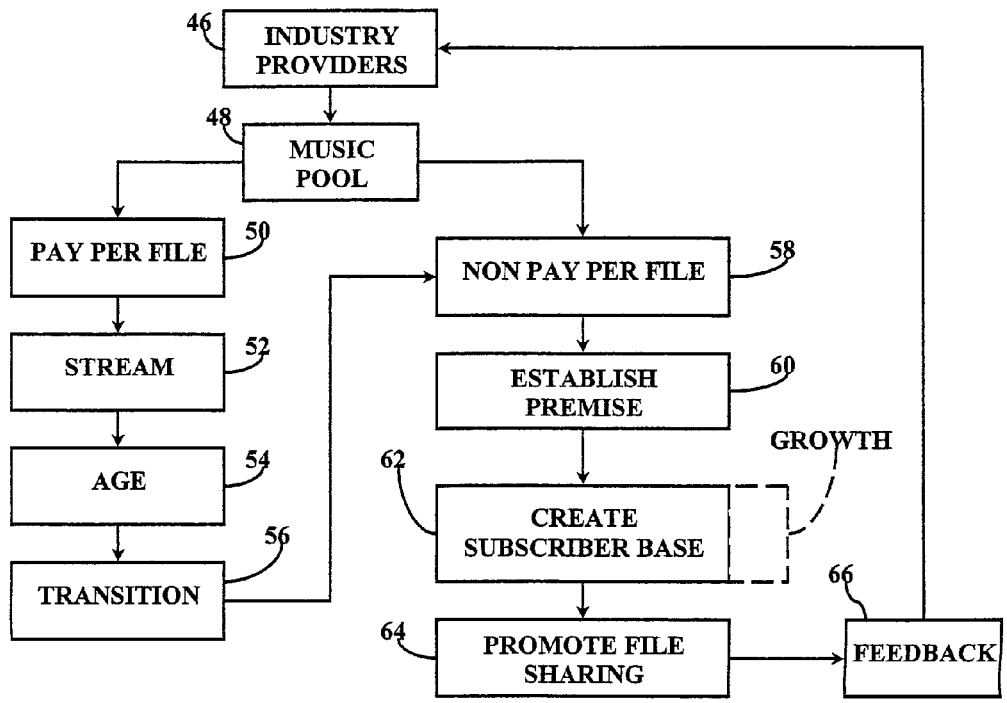
Figure 4:
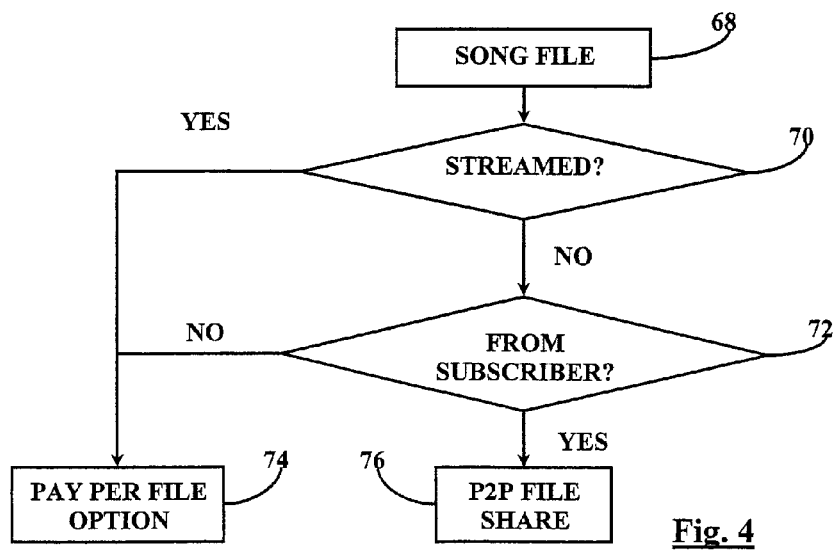

FIGS. 3 and 4 are block/schematic diagrams which relate to one another in illustrating a particular practice of the present invention with respect to the world of peer (network communicant) affinity groups interested in electronic music files, and with respect to which industry providers of these files differentiate distributable categories of music files through streaming and non-streaming handling of these files depending upon, for example, current file popularity and/or "age".

Figure 5:
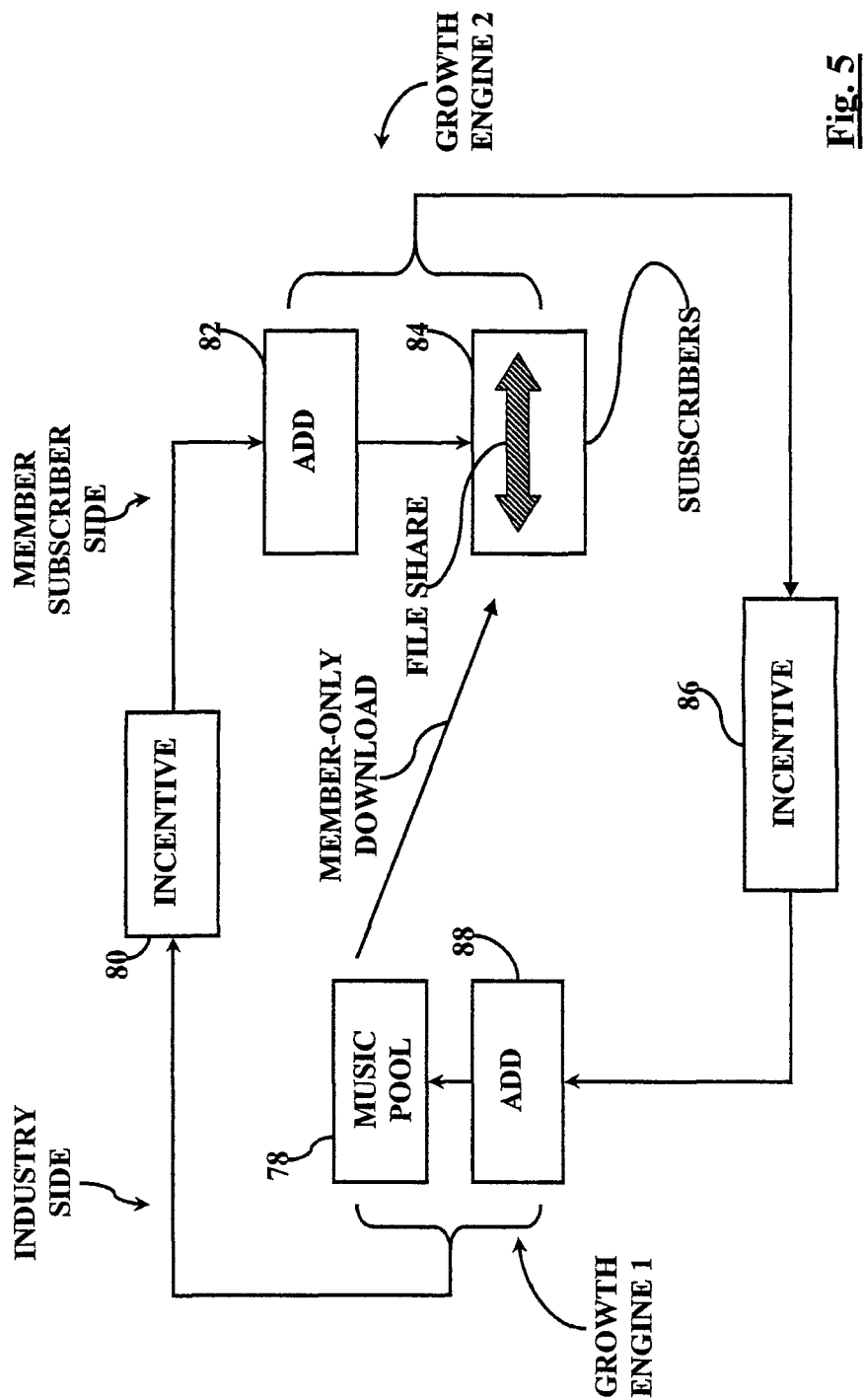

FIG. 5 is a block/schematic diagram illustrating how implementation and practice of the present invention can be viewed as an important positive feedback commerce enhancement system and methodology.

FIGS. 6-10, inclusive, viewed along with FIG. 1, provide high-level block/schematic "point-of-view" diagrams picturing, as will shortly be explained, the key steps involved in several different specific ways of characterizing the structure and operational features of the system and methodology of the present invention.

Figure 11:
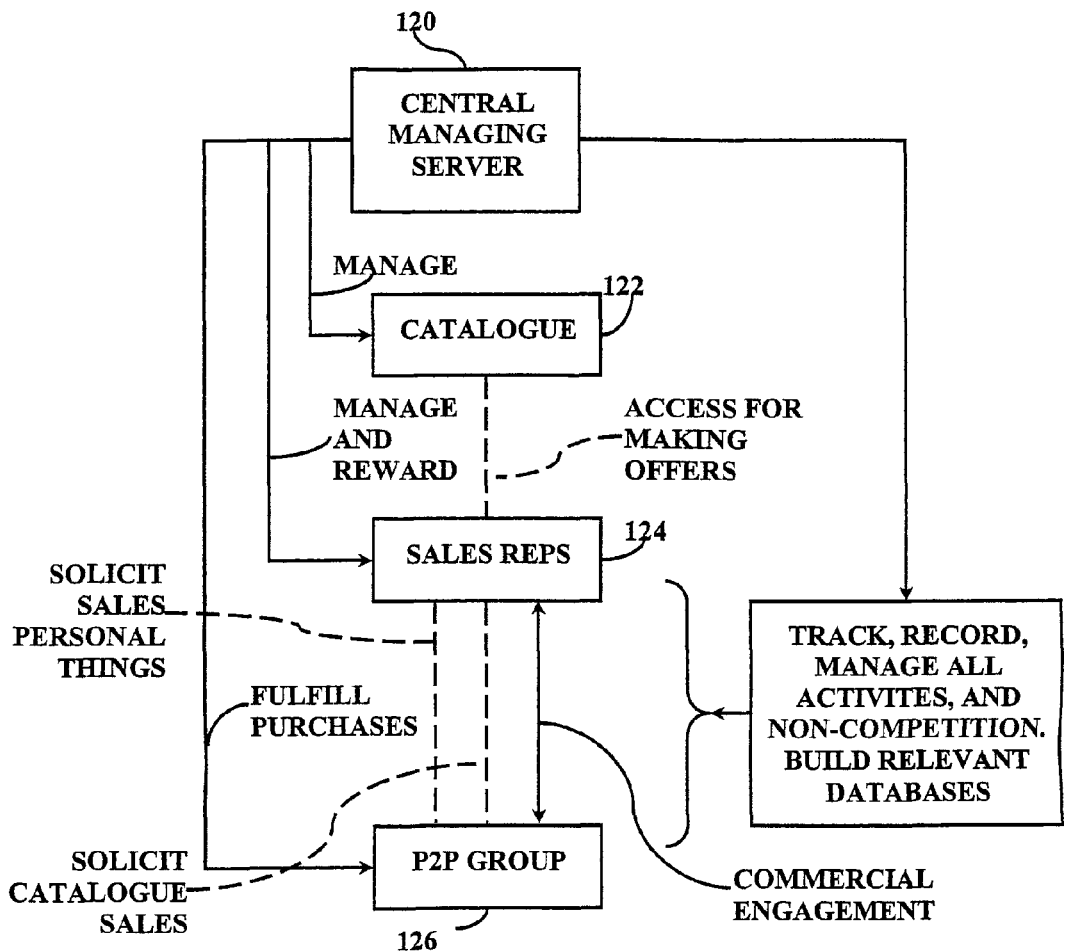
Figure 12:
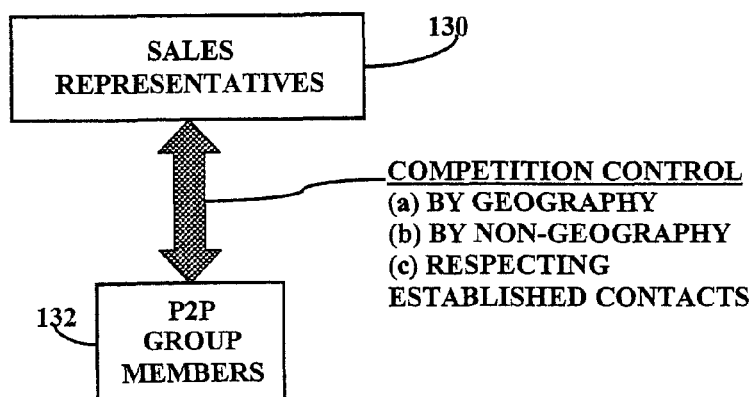

FIGS. 11 and 12 are a block/schematic diagrams which illustrate a specific manner of practicing the invention, wherein that practice, focused on media sales, is based fundamentally upon a selected sales-representative model for promoting commerce using peer-to-peer file sharing as the commerce communication vehicle.

FIGS. 13-15, inclusive, like previously mentioned FIGS. 6-10, inclusive, provide simplified, high level, "point-of-view", block/schematic diagrams presenting key steps involved in other ways of visualizing the system and methodology of the present invention.

All of these drawing figures illustrate features of all facets of the invention.

DETAILED DESCRIPTION OF THE INVENTION

Turning attention first of all to FIG. 1, indicated generally and fragmentarily in dash-dot lines at 20 is a wide-area network, such as the Internet, with respect to which the present invention is employed. One illustration of the structure and implementation (methodology) of this invention is shown generally at 22, with this illustration including blocks 24, 26, 28, 30, 32. These blocks are appropriately associated/connected with Internet 20. Dashed-line, double-ended arrows 34, 36, 38, 40 extend between different ones of these blocks, as shown, for reasons which will be explained shortly. Note that where the term "peer" is employed herein, this term also means "network communicant".

FIG. 1, in general terms, diagrams the basic vetted-peer entrepreneurship concept of the present invention which involves utilizing the extensive and powerful bandwidth of P2P file sharing between peers in an affinity group to promote commerce through employing linkage between (a) affinity subject matter associated with such a P2P affinity group, and (b) ancillary, or other, goods and services deliverables, all for the purpose of utilizing the practice of peer-driven file sharing to promote sales by outside (or other) parties of such other deliverables to members of the P2P affinity group.

Block 24 represents such an affinity group, with this block including plural members, such as the three members shown in small, shaded rectangles contained within block 24. Dashed arrow line 34 represents an affinity linkage between the members of group 24 and so-called affinity subject matter which is represented by block 28. An illustration of affinity subject matter which is useful for describing the present invention is electronically deliverable, "copyright sanctioned" music organized into song files. In the particular invention illustration now being given, the music files which make up affinity subject matter 28 are copyrighted music files with respect to which there are associated copyright rights holders who expect compensation for the downloading and delivery of files which become acquired by members in group 24.

According to the invention, members of the affinity-subject-matter right-holders group of entities, as well as others who may be offerers of various ancillary kinds of goods and services for sale, have chosen, as sourcing providers, to make certain goods and services available to one or more selected, vetted members of group 24 for promotion for sale to other members in group 24 in conjunction with P2P file sharing which takes place between members within group 24. Block 30 in FIG. 1 represents an authorized, electronic-data catalogue, or the like, which identifies all such deliverables. Such deliverables, which are represented in the catalogue in the form of electronic data, might include, in addition to completely ancillary goods and services that have little or nothing to do specifically with affinity subject matter, various other ancillary goods and service that do relate to affinity subject matter which, in the case of music files, might include posters, photographs and various group and artist paraphernalia. In an implementation of the invention which only involves commerce in the field of electronic media, blocks 28, may effectively be visualized as being merged, whereby the "catalogue" of deliverables includes only electronic media. All such subject matter, affinity-interest and ancillary, are thus aggregatable in various ways to make up a fulfillable sale, or sales, as promoted by vetted peers.

It should be understood that in the implementation of the invention, a suitable file sharing technology, typically in the form of software which may be made available to members of group 24 over the Internet, is indeed made available to those members of group 24 who choose to participate in the system and methodology of the invention, as, for example, by becoming subscribers for an appropriate, modest fee, referred to herein as a "good-standing" fee. This software may be any suitable type of file sharing software, the details of which, as was mentioned earlier, form no part of the present invention.

Similarly, the establishment of something like a catalogue of "other deliverables" is easily constructed and appropriately made accessible over the Internet for use as will be explained within group 24.

In accordance with practice of the invention, at least one peer member of group 24 is appropriately (entrepreneurially) vetted and selected by sourcing providers of catalogue deliverables to be given permission to make offers to other members of group 24 of deliverables for sale from the collection (or collections) thereof represented by block 30 (and/or block 28) in the FIG. 1. Preferably, such a selected peer group member is encouraged to utilize his or her own-imagined procedures and entrepreneurial talents for promoting interest in other peer members to "take a look" at offerings from these deliverables, along with presenting further encouragement to such other peers to make one or more purchases. One of the key, powerful features of the invention is that it is thus through peer promotion and enthusiasm that the offers of deliverables, linked with P2P file sharing, takes place. One can thus visualize this key as utilizing specific P2P "affinity group culture" as a driving force for commercial sales of the deliverables.

When a peer in group 24 who has received, as a consequence of file sharing activity, an encouragement (only by a vetted peer) to "take a look at the catalogue of deliverables", takes action, for example, by clicking on an offered deliverable, and thereby sending an electronic signal over the Internet, that action is preferably considered to have created what is referred to herein as a peer hit upon a promoted deliverable. Such a hit is represented by block 26 and dashed arrow line 36 in FIG. 1. Arrow line 36 is thus representative of the transmission of an electronic, over-the-network signal. In any appropriate manner which is well within the skill of those skilled in the art involving the creation of software, etc. associated with peer-to-peer file sharing activities, such a hit is appropriately recorded and preferably made known, for example, to a system manager for ultimate fulfillment, and also is recorded as digital electronic data to an appropriate memory location, such as might be represented by block 32 in FIG. 1, to establish for the offering peer a "peer hit" account which records hits attributable to the promotional activity of the offering peer. A peer hit may, of course, be as modest as a simple peer click to look and see what is being made available from the catalogue of deliverables, and, of course, as robust as a fully consummated and ultimately fulfilled sale.

Dashed arrow lines 38, 40 in FIG. 1, in a setting where commerce involving both electronic-media and other deliverables is involved, represent, respectively, (a) linkages which are made between available affinity subject matter and other deliverables, as promoted by a peer in group 24, and (b) access by members within group 24 to the offerings of other deliverables represented by block 30.

In any appropriate manner, also well within the skill of those skilled in the art of Internet communication computer technology, and in accordance with rules for practice established by the mentioned system manager, as the peer hit account for an offering peer member of group 24 crosses various predetermined performance levels, some form of award or appealing recognition, also represented by block 32, is given to (or is requested by) the associated offering peer. The system manager also implements, as required, the ancillary support service of delivery fulfillment of subject matter represented, for example, by dashed line 38, which line may thus also be viewed as representing management gathering and fulfilling of consummated sales.

What one can see from this description, and from the practice illustration presented in FIG. 1, is that a methodology is thus proposed which opens the door to significant promotion for the sales of goods and services which may or may not be directly associated with affinity subject matter—i.e., that subject matter which defines the area of initial and special interest for the exchange of information between peers in affinity group 24. By offering this methodology under, for example, a system-manager-controlled subscriber system wherein subscriber fees are made appealingly low, and wherein actual transfers of affinity subject matter files may be permitted within the operation of the system for relatively low, or even no, per-file-download payments from a receiving peer, members, and would be members, of an affinity peer group are encouraged to retain good-standing membership statuses in order to have access to relatively low-cost acquisition of affinity subject matter materials free from a threat, in case of copyrighted materials, of the possibility of adverse legal action. Peer members may also become enthusiastic about the commercial offers made and promoted by others among them, and may be encouraged by the prospect themselves of becoming authorized, peer-group offering entrepreneurs. Providers of ancillary catalogue deliverables who may pay fees to be "included" in the catalogue of deliverables will most probably experience nearly immediate and very widespread and remarkable low-cost promotion of their goods and services, well beyond what they have experienced or been able to support in the past, with resulting business growth driven by peer-culture entrepreneurial enthusiasm.

Rights-holder contributors of material to the supply of affinity subject matter deliverables, such as copyrights holders in electronically distributable music files, are presented with a structure which has the potential, through peer subscription membership growth, for growing their economic return from the expanded and paid-for distribution of such files, and the landscape of copyright combatancy between file sharing members of an affinity group and rights holders should shrink considerably.

FIG. 2, as outlined in its description above, illustrates a slightly modified version of what is shown in FIG. 1, wherein an "authorized" catalogue-offering peer 24a in peer affinity group 24 is also the same person as peer 26a in an a peer affinity group 26 which has interest in a different affinity subject matter. This peer (24a, 26a) who is common to groups 24, 26 (also referred to herein collectively as an electronic-network subassembly) thus acts as a gateway, or connector, between the two different P2P affinity groups, which can thus be thought of as being "collected" or "gathered" under the wing of, or at least in operative association with, common system management, or support-bridging by a common manager—this gathering gateway being represented in FIG. 2 by double-ended curved arrow 42, and by dashed-line block 44. Catalogues of deliverables associated with such two, different, chosen affinity groups may, of course, have different, group-relevant, as well as group-non-relevant, content, i.e., different affinity-interest and ancillary-subject-matter deliverables. Arrows 42, in the common-support-manager context just mentioned, is relatable to previously mentioned line 38 in FIG. 1. In a "definitional" sense, common support management in this kind of plural peer affinity-group setting, which includes ancillary aggregation fulfillment support, may thus be referred to as management support which is common (aggregation fulfillment) to the plural groups, but independent of the specific affinity-interest subject matters involved.

Such a group plurality of distributed, but readily connectable, (a) peers, (b) associated network hardware, (c) software, (d) databases, and (e) management services, etc., illustrated "elementally" in FIG. 2, helps to make understandable the massive network-cloud commerce-expansion which is made achievable by the present invention.

Turning to FIGS. 3 and 4, these two figures illustrate a particular practice of the present invention in relation to a P2P affinity group which has an affinity interest in music of a particular character, and wherein providers, referred to as industry providers, of such affinity-group music have determined to make music files available in two categories of files, one of which categories contains, say, current high-popularity, hit-list song files, and other of which contains music files which may have "graduated", for example, from a hit-list category either because of declined popularity, or elevated age.

FIG. 3 illustrates this form of practice of the invention in blocks evenly numbered 46-66, inclusive. Interconnecting activity lines are illustrated in FIG. 3 by solid arrow-headed lines as shown.

In FIG. 3, block 46 represents a population of copyright rights holders (entities) in music song files, and these entities, referred to, as mentioned above, as industry providers, make such files available to an accessible (over the Internet) music file pool represented by block 48. The rights holders for these music files have chosen to characterize them as belonging in one or the other of the two different categories of files identified above. Song files which are the "young", and/or high-popularity, files follow an activity flow path generally represented by blocks 50, 52, 54 and 56. The other files generally follow a flow path which is represented by blocks 58, 60, 62 and 64.

In accordance with the practice specifically illustrated in FIG. 3, a high-popularity music file, for example, will be treated as something for which a recipient peer will pay on a per-file basis for a file-share download, with this file being otherwise delivered over the Internet only through the practice known as streaming so as clearly to identify it as not being obtainable except through payment. According to the FIG. 3 practice of the invention, streamed files are tagged with appropriate markers which effectively "age" these files in relation to their retention in a hit-list category, and when aged beyond a point wherein they should remain in this category, these files are transitioned, in effect, by applying appropriate electronic markers to them which then designate them as copyright sanctioned, non-pay-per-file song files. Such a "transition" is represented by the arrow-headed line which interconnects blocks 56, 58 in FIG. 3.

Song files which are either initially designated to be non-pay-per-file files, or which become such following a transition as just described, are made available to affinity group peers under an established premise which defines them as non-pay-per-file files, and which allows them to be distributed, in a non-streaming manner, to subscriber members in good standing of the relevant affinity peer group. File sharing of these files which, in accordance with the practice now being described, are not in the pay-per-file category are made directly available for P2P file sharing within the relevant affinity group.

Relevant feedback information, represented by block 66 in FIG. 3, is provided to the so-called industry providers as an encouragement to continue to grow the contents of song files available in the music pool represented by block 48 in FIG. 3.

FIG. 4, in five blocks 68, 70, 72, 74, 76, further illustrates what has just been described with respect to FIG. 3 in relation to how the two different categories of files mentioned are handled for delivery over the Internet.

Looking now at FIG. 5, six blocks, evenly numbered 78-88, inclusive, illustrate, in a relatively self-explanatory way, how practice of the present invention can be visualized as being a positive feedback commercial methodology in a music-file-based situation based upon growing the file sharing behavior of peer members within a P2P file sharing affinity (music) group. Labeling which is presented in FIG. 5, along with the interconnected blocks in this figure, clearly illustrate how the invention can be viewed as being a commercial positive feedback arrangement. Song files in music file pool 78 which are contributed by copyright rights holders are made available at an appealing cost to members in good standing of a subscriber group of peer-to-peer file sharers, and this attractive pricing for available files incentivizes (block 80) network growth through addition of members (block 82) within the relevant P2P file sharing affinity group. Through employing offers of other deliverables as described with respect to FIG. 1, and in collaboration with file sharing behavior which takes place within the appropriate file sharing affinity group, this activity will generate commercial interest in the purchase of what has been referred to herein as other deliverables, and will incentivize (block 86) song-file rights holder to grow the quantity of media-file information (block 88) made available via music file pool 78. Deliveries (i.e., fulfillment) of other deliverables which are non-electronic are appropriately made by supporting management.

If one simply thinks carefully about the basic mechanism of this invention as described so far herein, one can readily see how a positive feedback loop, such as that illustrated in FIG. 5, is driven to promote commerce not only in distributable music files but in other deliverables, in a fashion wherein this feedback loop can be considered to possess two important growth engines which are represented, as illustrated, at the opposite sides of FIG. 5.

Turning now to "point-of-view" drawings 6-10, inclusive, FIG. 6, at 89, generally illustrates the invention as a P2P business method which includes the steps of (a) IDENTIFYING (block 90) an active P2P network characterized with peers having a defined affinity interest in the exchange of at least category-A information (which may be music song files), and (b) EMPLOYING (block 92) that at-least category-A information-exchange affinity interest as a carrier vehicle and growth engine for the promotion, within that network, of collateral income-generating transactions between a peer and another peer or a party outside the network. Recalling the discussion given above in relation to FIG. 1 in the drawings, one can readily appreciate this manner of describing the present invention.

FIG. 7, at 93, provides a high-level way of viewing the invention as a P2P business-growth-enhancing method which is relevant to the income-generating transactional delivering of goods and/or services, and which utilizes, as an engine for such enhancement, the practice of P2P file sharing of selected information-material (such as music files) which is associated with possessor-owned relationship rights (e.g. copyright rights), with this method including the steps of (a) OFFERING (block 94) to peers, for rights-conflict-free sharing in a P2P information-sharing network, possessor-rights-sanctioned contents drawn from such material, and (b) by that act of offering, and based upon peer initiated affinity behavior within the P2P network which is stimulated by features associated with the offered content, and in a manner which is independent of the quantity of P2P shared material, PROMOTING (block 96) commercial transactional engagement between a peer in the network and a non-peer commercially who may be associated with the rights-possessors of such sanctioned materials.

The FIG. 8 view of the present invention can be understood as illustrating it, at 97, to be a broadband, distributed, goods/services-promotion system which is based upon (a) ESTABLISHING (block 98) a goods/services-provider sanctioned-for-delivery offering package, (b) DELIVERING (block 100)

that package to at least one selected P2P file-sharing participant designated to be a sub-delivery host, (c) INCENTIVIZING (block 102) self-designed sub-delivery by that host to other P2P file sharing participants by crediting that host with a hit account specific to the host, and by offering hit-redemption values to the host, and on the basis of a sub-delivery host's build-up in the associated hit account, (d) FULFILLING (block 104) host-requested award redemptions.

FIG. 9, at 105, illustrates the invention as being a method for enhancing digital music-industry income relative to the distribution of copyrighted music files including the steps of (a) RECOGNIZING (block 106) that P2P network file sharing is a promising engine of economic growth for the industry, (b) DIVIDING (block 108) digital music files effectively into at least two categories including (1) network streamed, non-file-sharable files, and (2) network non-streamed, file-sharable files, and (c) LINKING (block 110) differentiated income-producing fees to two such categories.

FIG. 10, along with previously discussed FIG. 5, illustrates the invention at 111 as taking the form of a positive feedback loop for spurring economic growth in the digital recorded music industry which, from a methodologic point of view, includes the steps of (a) ESTABLISHING (block 112) an industry-contributed, ever-growing body of digital music files, (b) ATTRACTING (block 114) a population of subscribers who, for paid subscriber membership fees, are given access to those files for otherwise free P2P membership-only file sharing, and who, as subscriber members, are identifiably accessible to contributing industry participants for the presentation/reception of various permission-based industry-contributed offerings, (c) ENHANCING (block 116) that action of attracting in order to promote growth in the mentioned subscription population through the practice of industry-characterizing all of such contributed files as copyright-sanctioned files, and (b) UTILIZING (block 118) such promoted subscriber-membership growth as feedback encouragement to incentivize expanded industry participation in the practice of contributing to, and growing the quantity of, files in the body of files.

One will observe that these several ways of viewing the nature of the present invention fit within different ones of the general "models" of the invention pictured in FIGS. 1-5, inclusive.

FIG. 11, in five blocks, 120, 122, 124, 126, 128, and FIG. 12 in two blocks, 130, 132, collectively illustrate the present invention from a point of view which is based upon promoting, among other things, electronic media sales by introducing media-sales-representative behavior into a P2P network. These two figures illustrate an expression of the invention wherein a central managing server 120, under the control of a system manager, manages both a digital electronic catalogue 122 of goods and services which may be offered within the practice of a P2P file sharing network, as well as the activities of selected peers 124 in an affinity group 126 who have been chosen to be designated as authorized sales representatives for the making of offers for sale of goods and services from this catalogue. The central managing server, under appropriate implementation by the system manager, manages, as ancillary sales support, fulfillment (such as aggregation and delivery) of orders from the catalogue with respect to P2P file sharers who respond to promotional advertising by making purchases of goods from the mentioned catalogue. Central management, and the central managing server, also variously track, record and manage (block 128) all promotion and response activities which take place between authorized sales representatives and other members of a peer group, assures non-competition protection as between plural sales representatives who operate within the same peer-to-peer affinity group, and builds relevant databases regarding promotion and response activities, which databases are then usable to tailor, modify and control the operation of the invention so as to maximize the enhanced commercial activity which takes place in the context of P2P file sharing.

FIG. 12 specifically, and self-explanatorily, illustrates (utilizing specific word labeling) several ways in which non-competition management may be implemented.

FIG. 13, along with FIGS. 11 and 12, illustrates at 133 an authorized-sales-representative method for using the network communication bandwidth of a group of P2P file sharers having an affinity for electronically distributable media to enhance the sales of such media, with this method including the steps of (a) ESTABLISHING (block 134) a vetted-peer authorized-access-only catalogue containing identification of such media, (b) AUTHORIZING (block 135) at least one selected member of the P2P group to make offers of media sales from the catalogue to other members of the group, and (c) PROVIDING (block 136) a reward to that authorized, selected member in relation to the occurrence of at least one offered and at least partially implemented sale of media from the catalogue. These three figures taken together also illustrate this same method which further involves the presence of an appropriate manager, such as the system manager, and which includes the additional step of encouraging the authorized group member selectively to couple with such an offer an independent, non-catalogue offer for sale of subject matter of the authorized member's choosing subject to approval by the media manager.

FIG. 14, taken along with FIGS. 11 and 12, promotes a view at 137 of the present invention which is that it takes the form of a method for promoting the sales of rights-associated electronically distributable electronic media made available by a media-rights authorizing entity, and including the steps of (a) CREATING (block 138) a catalogue including electronic media content the presence of which in the catalogue is supported by media-rights authorizing entities, (b) SELECTING (block 140), to be authorized as a catalogue sales representative at least for the media content, an identified participant in a P2P file-sharing group having an affinity for the catalogue media content, (c) ENABLING (block 142) the selected, authorized participant to offer to other participants in the affinity group media content for purchase from the catalogue employing marketing strategies that are self-developed and cleared with advisories from the authorizing entity, (d) TRACKING (block 144) purchase activities involving such offered media content, and (e) REWARDING (block 146) the selected, authorized participant in relation to implemented sales from the catalogue based upon sales offers made by that participant.

FIGS. 11, 12 and 14 can also be viewed as illustrating the invention in the form of being a method for promoting the sales of rights-associated electronically distributable electronic media involving the steps of (a) CREATING (block 138) a central-server-managed catalogue including electronic media content the presence of which in the catalogue is supported by media rights holders, (b) SELECTING (block 140) to be authorized as a central-server-managed catalogue-sales representative, at least for the media content, an identified participant in a P2P file sharing group having an affinity for the catalogue media content, (c) ENABLING (block 142) the selected, authorized participant to offer to other participants in the affinity group media content for purchase from the catalogue, (d) TRACKING (block 144) purchase activities involving such offered media content, and (e) REWARDING (block 146) the selected, authorized participant in relation to implemented sales (or hits) from the catalogue based upon sales offer made by that participant.

FIG. 15, along with FIGS. 11 and 12, can be viewed as illustrating practice of the present invention at 147 as providing a method for enhancing the sales of electronically distributable media using the network communication bandwidth of a group of P2P file sharers possessing an affinity for such media, including the steps of (a) INTRODUCING (block 148) media-sales-representative behavior into that group with controlled access provided to a catalogue of such media from which offers of media sales can be made to members in the group, and (b) INCENTIVIZING (block 150) such introduced behavior.

Thus, the present invention can clearly be seen to involve proposed computer signal-transmission, network methodology and a system which are based upon a paradigm shift in relation to current thinking about the nature of a P2P file sharing network structure, as well as about like, various-affinity-interest, network-consumer network structure, particularly as such a network structure is perceived today in the context of commerce involving network-deliverable, electronic media files, such as music song files and movie files. There are many attractive and beneficial commercial and other features which characterize this invention—features which take square aim at utilizing the extraordinary power and reach of P2P file sharing, and like affinity-interest network-consumer behavior, to promote a very wide range of commercial transactions, thus to grow and enhance various commercial income streams.

The role of a system manager, and the thereby controlled system-management server, are, as explained, quite varied and important. In this role, the manager, among other things, furnishes, as needed, sales-conclusory aggregation and fulfillment of commercial transactions, thus providing important, conclusory-fulfillment support to one, or plural, group(s) of affinity-interest P2P peers and other consumers—aggregating for delivery, as required, different affinity-interest and ancillary catalogue deliverables. This support, as is evident from the discussion above, is, strictly speaking, independent of the particular characteristics of affinity-interest and ancillary subject matter involved in the relevant transactions.

In accordance with implementation and practice of the invention, and specifically discussing certain features and advantages of the invention in the important and illustrative context of music song file sharing, peers in a music affinity group are enticed to join, and to remain as "good-standing" subscribers with, a service, such as a subscription service, offered, in accordance with practice of the present invention. More specifically, such enticement will be promoted and enhanced (a) by preferably relatively low subscription fees, (b) by preferably relatively low (or in some instances no) pay-per-music-file-download fees, (c) by a blend of (a) and (b), (d) by the opportunity offered to affinity group peers to participate in rights-related media file sharing without fear of copyright infringement actions taking place, (e) by the exposure of peer affinity group members to interesting, peer-driven offers to acquire, in addition to music song files, ancillary deliverables, (f) by the possibility for peers in an affinity group to become authorized, and ultimately rewarded, "offerers" within an affinity group, (g) and by other attractions which will certainly come to the minds of those who think about the possibilities offered by the present invention. These enticement and other advantage factors which are associated with the present invention will lead naturally, or should so lead, to significant population growths in relevant affinity-subject-matter groups, which growths will most likely expand the commercial enhancement offered by the invention.

Music copyright rights holders will be attracted by the potential, and the probable reality, of growing groups of peers whose activities will be non-infringing in relation to copyright rights, and which growing may well lead to a significantly enhanced income stream to such rights holders derived from any one or more of (a) growing, direct, per-file-download payments from subscription-member peers, (b) a received share, perhaps, in "peer membership" subscription fees, and (c) the possibility even of receiving a share in revenues generated by sales, occurring within an affinity group, of various ancillary deliverables. Appropriate filters may be associated with rights-controlled media files to protect media rights holders positively against copyright infringement.

Rights holders may well discover that implementation of the present invention may produce revenue streams that clearly out-distance those generated by classical "sales" of media content. In fact, one startling effect might be that the nature of such an enhanced revenue stream could cause media rights holders actually to promote P2P file-sharing group growth—a promotion behavior plainly taggable by conventional thinking as being heretical. A paradigm shift, indeed!

Fulfillment support linked by a manager to this new form of network-consumer activity significantly enhances this paradigm shift.

In an implementation of the invention which involves the offering and selling of ancillary deliverables that will be made available by third-party providers who are not copyright rights holders or peers, these providers, who may be expected to pay modest fees for having their deliverables offered through a catalogue of the type mentioned herein, may well experience significant income growth because of the extensive dispersal of information about their offerings which will occur as a consequence of widespread P2P file sharing activities.

As has been mentioned earlier herein, of central importance to the power for enhancing commerce which is offered by the present invention is the fact that core impetus for growth is driven by authorized and encouraged affinity-interest-group enthusiasm linked with imaginative peer (group member) entrepreneurship, and all supported by over-arching system management as outlined. The present invention thus attaches itself in a unique way to the core spirit, enthusiasm and culture which centrally drives the extraordinary growth, and ever-present activities, surrounding bulging network commerce.

Evidenced in the above-given descriptions, and in the drawings, coupled with text furnished in the "Background and Summary of the Invention", and recognizing the newly applied terminology to the various, relevant "legal persons", one sees the unique facet of the invention which can be characterized as:

A sourcing-provider-implemented, electronic-commerce, communication-network method for controlling commercial-transaction network-acquisition-access to particular, electronically-deliverable, affinity-interest deliverables in portions of which rights are held both by a sourcing provider and by a contributing network communicant, where (a) a sourcing-provider is a legal person having a common interest in all, relevant, affinity-interest deliverables, (b) a network communicant is a legal person having an affinity attachment to defined, electronically-deliverable, affinity-interest subject matter which may become associated by that network communicant with an affinity-interest deliverable, and (c) a contributing network communicant is an entrepreneurially-vetted and authorized network communicant, said method being confinedly implementable in such a network, and including as operative steps:

(1) establishing an electronic, network-connected, sourcing-provider-associated and controlled catalogue designed to contain at least one such deliverable;

(2) vetting the entrepreneurial talent of at least one network communicant in relation to the creation, catalogue-placement, and network-acquisition-promotional offering to others, by that one communicant of such a deliverable, whereby, through deliverable-creation and catalogue-placement thereof, the vetted network communicant becomes a contributing network communicant;

(3) authorizing the vetted network communicant to become a contributing network communicant, and to create, to place or have placed, and to offer to other network communicants, commercial-transaction, deliverables-acquisition network access to such a catalogue-placed deliverable; and rewardingly incentivizing such network-acquisition offers made by the contributing network communicant.

Practice of the invention, as will be readily recognized by those skilled in the electronic network arts, intimately links with and utilizes otherwise conventional and well known electronic-signaling, computer-network hardware machinery (client computers, and servers), physical electronic databases, firmware and software which are required for its practice. The term "electronic" herein takes on it usual broad meaning in the relevant arts, involving electrical, electrostatic, magnet, and optical devices and signaling, data-storing and related matters and practices. It thus encompasses the usual electronic signal transformation which occurs when, for examples, text, imagery, and other information which represent electronic and physical objects become transformed into electronic signals that flow in a network to enable the communication and storage of information regarding real world objects.

Those skilled in the art will certainly appreciate all of the opportunities and advantages which are offered by the present invention, and may well perceive other features and advantages which come well within the scope of the present invention, but which may not have been specifically expressed in this disclosure text and in the drawings accompanying this text. All such additional features and advantages are considered, of course, to come within the scope of the present invention as claimed herein.

We claim:

1. A sourcing-provider-implemented, electronic-commerce, communication-network method implementable in, and employing the structure of, an electronic-information communication and exchange network, for controlling commercial-transaction network-acquisition-access to particular, electronically-deliverable, transformably-electronically-represented, affinity-interest deliverables in portions of which rights are held both by a sourcing provider and by a contributing network communicant, where (a) a sourcing-provider is a legal person having a common interest in all, relevant, affinity-interest deliverables, (b) a network communicant is a legal person having an affinity attachment to defined, electronically-deliverable, affinity-interest subject matter which may become associated by that network communicant with an affinity-interest deliverable, and (c) a contributing network communicant is an entrepreneurially-vetted and authorized network communicant, said method being confinedly implementable in such a network, and comprising establishing, in network-connected computer structure, an electronic, network-accessible, network-connected, but limited access, sourcing-provider-associated and controlled digital-data catalogue designed to contain at least one such deliverable transformably represented by electronic data stored in the catalog, limiting access to deliverable subject matter represented by electronic data stored in the established catalog to only (a) an entrepreneurially-talented, vetted peer, and (b) another network-communicant party who is a potential purchaser, and to whom such access is furnished specifically, and only, by such a vetted peer, and solely for the purpose of considering, and if desired, engaging in, the purchase of a catalog-display deliverable, vetting the entrepreneurial talent of at least one network communicant in relation to the creation, catalogue-placement, and network-acquisition-promotional offering to others, by that one communicant of such a deliverable, whereby, through deliverable-creation and catalogue-placement thereof, the vetted network communicant becomes a contributing network communicant, authorizing the vetted network communicant to become a contributing network communicant, and to create, to place or have placed, and to offer to other network communicants, commercial-transaction, deliverables-acquisition network access to such a catalogue-placed deliverable, and rewardingly incentivizing such network-acquisition offers made by the contributing network communicant.

* * * * *

UNITED STATES PATENT AND TRADEMARK OFFICE
CERTIFICATE OF CORRECTION

PATENT NO. : 8,417,565 B2
APPLICATION NO. : 12/836566
DATED : April 9, 2013
INVENTOR(S) : Robert D. Summer et al.

Page 1 of 1

It is certified that error appears in the above-identified patent and that said Letters Patent is hereby corrected as shown below:

On the Title Page, add Item (60):

--(60) Provisional application No. 60/585,491, filed on Jul. 2, 2004, provisional application No. 60/585,492, filed on Jul. 2, 2004.--

Signed and Sealed this
Ninth Day of July, 2013

Teresa Stanek Rea
*Acting Director of the United States Patent and Trademark Office*